United States Patent

Bowen et al.

[11] Patent Number: 5,704,402
[45] Date of Patent: Jan. 6, 1998

[54] AIR BAG FABRIC

[75] Inventors: Derek L. Bowen; Charles L. Bower; John A. Sollars, Jr., all of LaGrange, Ga.

[73] Assignee: Milliken Research Corporation, Spartanburg, S.C.

[21] Appl. No.: 625,311

[22] Filed: Apr. 1, 1996

[51] Int. Cl.⁶ .................................................. D03D 47/32
[52] U.S. Cl. .................. 139/389; 280/728.1; 280/743.1; 428/36.1
[58] Field of Search ........................... 280/743.1, 728.1; 139/389, 420 A; 428/225, 36.1

[56] References Cited

U.S. PATENT DOCUMENTS

| 5,093,163 | 3/1992 | Krummheuer et al. | |
|---|---|---|---|
| 5,215,795 | 6/1993 | Matsumoto et al. | 428/225 |
| 5,236,775 | 8/1993 | Swoboda et al. | 139/389 |
| 5,277,230 | 1/1994 | Sollars, Jr. | 139/389 |
| 5,375,878 | 12/1994 | Ellerbrok et al. | |
| 5,477,890 | 12/1995 | Krummheuer et al. | |

FOREIGN PATENT DOCUMENTS 6-322636  11/1994  Japan ...................... 139/389

OTHER PUBLICATIONS

Load-equivalent Fabrics in an Airbag system for Worldwide Application, Norbert Ellerbrok/Klaus Fruck/Dr. Florian Kramer/Michael Stark, Bag & Belt '94 3rd International Akzo Nobel Symposium on Automotive Occupant Restraint Systems.

*Primary Examiner*—Andy Falik
*Attorney, Agent, or Firm*—Terry T. Moyer; James M. Robertson

[57] ABSTRACT

The woven structure for an air bag is designed to have an air permeability which does not increase by more than about fifty percent when the fabric is subjected to substantially equivalent tension forces in both the warp and fill. This is accomplished by a multiple warp harness arrangement using combinations of twill and basket weave pattern components. This weave construction does not only avoid substantial increases in permeability over a range of biaxial tensions but also may result in a permeability decrease when subjected to tensions which approximate those applicable during actual air bag deployment.

32 Claims, 4 Drawing Sheets

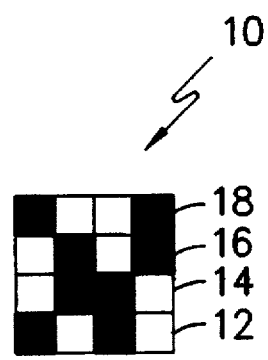
FIG. -1-
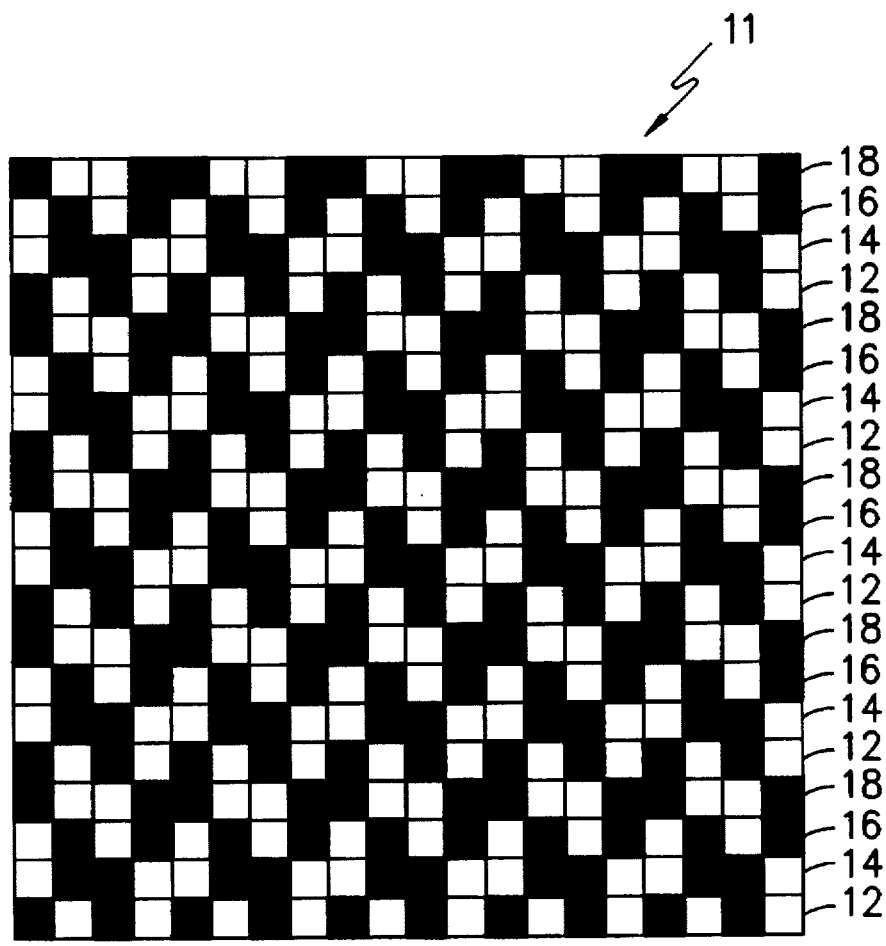
FIG. -2-

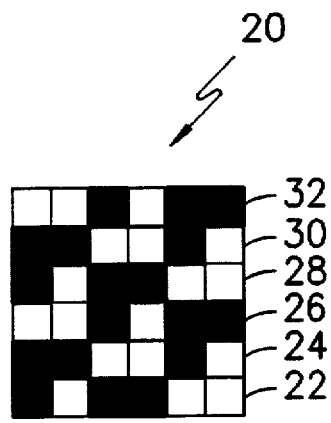
FIG. -3-
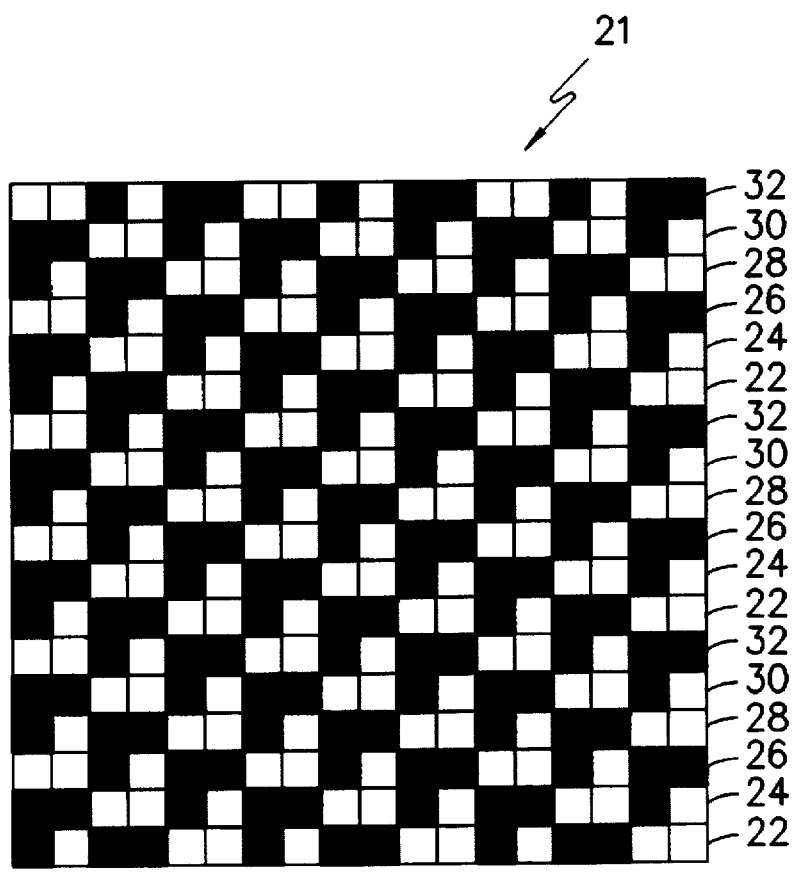
FIG. -4-

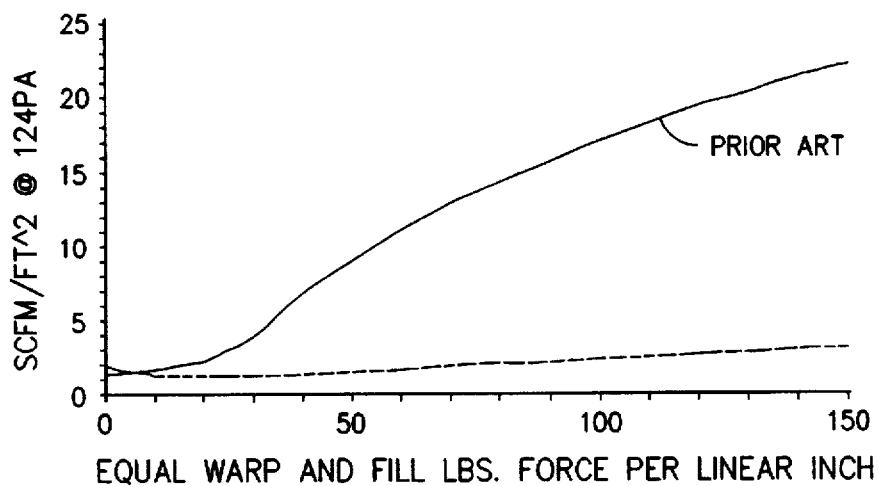
FIG. -5-
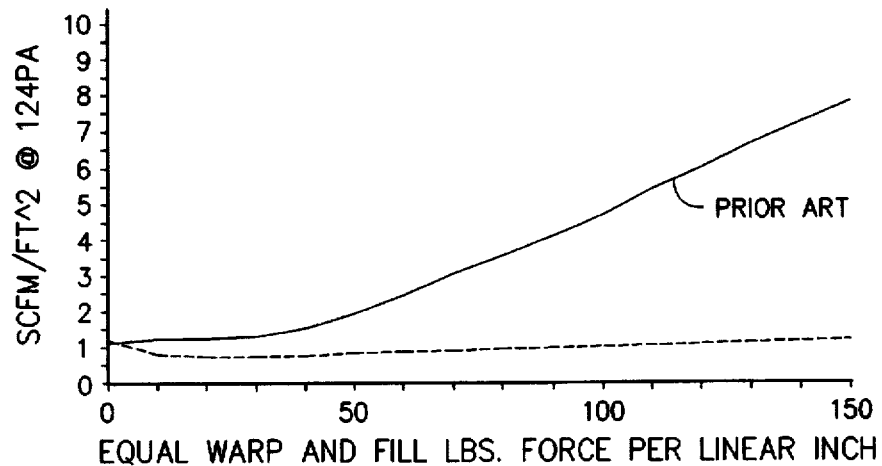
FIG. -6-
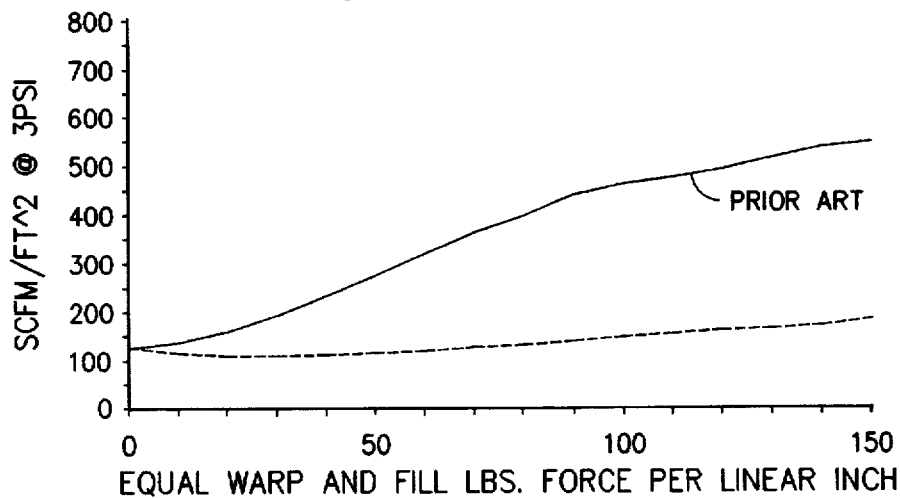
FIG. -7-

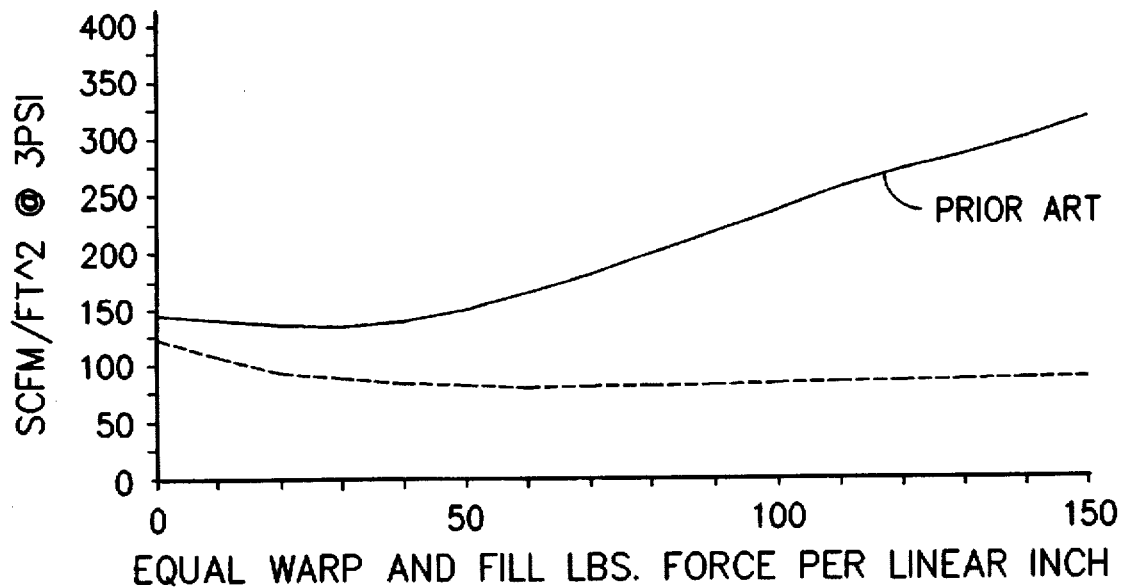
FIG. -8-
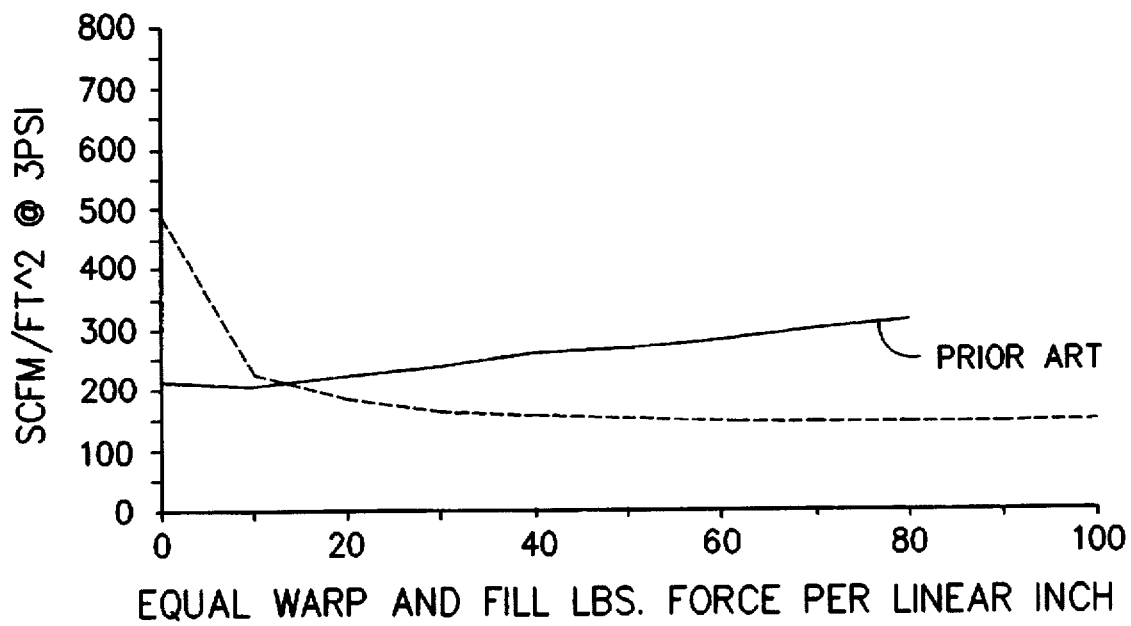
FIG. -9-

AIR BAG FABRIC

BACKGROUND OF THE INVENTION

Passive collision restraint systems typically incorporate a cushion portion which is manufactured from a woven textile material. Such cushion portion is inflated during a collision event so as to provide a barrier between a vehicle occupant and the vehicle interior structures against which that occupant would otherwise be thrown. As will be appreciated by those of skill in the art, the deployment of an air bag cushion is an extremely rapid and violent event which is initiated and completed within milliseconds. Such deployment and subsequent impact is believed to place the fabric of the cushion under substantial stresses.

A standard measure of performance for air bag fabrics is air permeability. These standards have historically been set and measured in relation to fabrics which are in a substantially non-tensioned environment such as in the procedure set forth by ASTM-D737. It has been postulated that typical fabrics which have historically made use of plain weave or ripstop weave constructions as are well known in the art will display fairly substantial increases in air permeability when subjected to tensional forces. It is an objective of the present invention to produce a fabric in which the air permeabilities will not substantially increase when subjected to tensions as may occur during deployment of an air bag cushion.

SUMMARY OF THE INVENTION

The above objective is accomplished according to the present invention by weaving an air bag fabric in a multiple warp harness arrangement using combinations of twill and basket weave components. Such weave constructions have been surprisingly found to not only avoid substantial increases in permeability over a range of linear tensions but to actually display a decrease in air permeability when subjected to tensions in certain ranges which may be applicable during actual air bag deployment and impact.

BRIEF DESCRIPTION OF THE DRAWINGS

The invention will be more readily understood from a reading of the following specification and by reference to the accompanying drawings forming a part thereof and wherein:

FIG. 1 is a weave diagram illustrating a potentially preferred repeating pick pattern formed using a four pick arrangement;

FIG. 2 is a weave diagram illustrating the multiple repeat arrangement formed by the pick pattern in FIG. 1.

FIG. 3 is a weave diagram illustrating an alternative pick repeat pattern according to the present invention formed using a six pick structure;

FIG. 4 is a weave diagram illustrating the multiple repeat arrangement of the pick pattern illustrated in FIG. 3;

FIG. 5 illustrates the relation between air permeability at a differential pressure of 124 Pascals across the fabric and uniform applied tension for a 315 denier construction air bag fabric formed according to both the prior art and the weave diagram of FIGS. 1 and 2.

FIG. 6 is a graph similar to FIG. 5 for a 630 denier fabric;

FIG. 7 is a graph similar to FIG. 5 wherein the Y-axis represents air permeability at a differential pressure of 3 psi;

FIG. 8 is a graph similar to FIG. 7 for a 630 denier fabric.

FIG. 9 is a graph similar to FIG. 7 for a 70 denier×100 denier construction formed in accordance with FIGS. 3 and 4.

While specific embodiments of the present invention have been illustrated and will be described, it is to be understood that the invention is not limited thereto, since modifications may be made and other embodiments of the principals of this invention will occur to those skilled in the art to which the invention pertains. Rather, it is intended to cover all such alternative embodiments, procedures, and modifications thereto as may fall within the true spirit and scope of the invention as limited only by the claims herein and equivalents thereto.

DESCRIPTION

Turning now to the drawings, in FIG. 1 there is shown a four pick pattern 10 formable by means of a multiple harness weaving practice as is well know to those of skill in the art. In FIG. 2 the replication of this pick pattern across the surface of a woven fabric 11 is illustrated. Specifically, in the illustrated and potentially preferred embodiment, a fabric is formed from a four pick repeat pattern utilizing four body harnesses. For the first pick 12, first and third warp ends are preferably up while the second and fourth warp ends are down. As illustrated, this results in the pick yarn being passed below the first and third warp ends and above the second and fourth warp ends. For the second pick 14 the second and third warp ends are preferably up while the first and fourth warp ends are down. This results in the pick yarn passing over first and fourth warp yarns while passing beneath second and third warp ends. In the third pick 16, second and fourth warp ends are preferably up while first and third warp ends are down. This results in the pick yarn passing over first and third warp yarns and beneath second and fourth warp yarns. In the fourth pick, first and fourth warp ends are preferably up while second and third warp ends are down. This results in the pick yarn passing below first and fourth warp yarns and over second and third warp yarns. This same movement of the harnesses and resulting pick pattern is thereafter repeated time and again as the fabric is woven. It will be appreciated that while the manufacture of the preferred embodiment has been described in relation to a four harness system, any other system which permits the fabric to be formed with the configuration as described may likewise be utilized.

In FIG. 3 there is shown a six pick repeat pattern 20 according to a second embodiment of the present invention. The repeating arrangement of the pick repeat pattern of FIG. 3 across a woven fabric 21 is illustrated in FIG. 4. In the illustrated pick repeat pattern, in the first pick 22 first, third and fourth warp ends are preferably up while second, fifth and sixth warp ends are down. In the 2nd pick 24 of the illustrated pick repeat pattern, first, second and fifth warp ends are preferably up while third, fourth, and sixth warp ends are down. In the 3rd pick 26 third, fifth and sixth warp ends are preferably up while first, second, and fourth warp ends are down. In the 4th pick 28 of the repeat pattern in FIG. 3, first, third, and fourth warp ends are preferably up while second, fifth, and sixth warp ends are down. In the 5th pick 30 of the illustrated repeat pattern, first, second, and fifth warp ends are preferably up while third, fourth, and sixth warp ends are down. In the 6th pick 32 of the repeat pattern, third, fifth, and sixth warp ends are preferably up while first, second, and fourth warp ends are down. A weave diagram indicating the resultant fabric structure utilizing the pick repeat pattern illustrated and described in relation to FIG. 3 is shown in FIG. 4. As illustrated, utilization of the six pick repeat pattern produces a balanced and substantially symmetrical pattern wherein the warps across each pick are characterized by a repeating arrangement of 1 up, 1 down, 2 up, 2 down.

As indicated, a perceived benefit of the present invention is the production of fabrics wherein the air permeability is not substantially increased, and may actually decrease, as the fabric is subject to tensile stresses such as may occur during a collision event involving the air bag fabric. In FIG. 5 measurements of air permeability for fabric formed according to the weave diagrams of FIGS. 1 and 2 using 315 denier yarn according to the present invention and a plain weave fabric using 315 denier yarn according to the prior art at a nominal weave density of 60×60 threads per inch are compared across a range of biaxial tensions of equal magnitude in the warp and the fill directions. In FIG. 6, measurements of air permeability for fabric formed according to the weave diagrams of FIGS. 1 and 2 using 630 denier yarn according to the present invention and a plain weave fabric using 630 denier yarn according to the prior art at a nominal weave density of 41×41 threads per inch are compared across a range of biaxial tensions of equal magnitude in the warp and the fill directions. The permeabilities in FIGS. 5 and 6 were measured at a differential of 124 Pascals or approximately 0.5 inches of water across the fabric in accordance with standard testing procedures.

As is apparent, traditional prior art plain weave fabrics exhibit substantial increases in air permeability as applied tension is increased. Conversely, fabrics according to the present invention exhibit initial reductions in air permeability followed by only modest increases over a full range of tensions from zero to 150 pounds force per linear inch of fabric. As illustrated, in fact, there was substantially no increase in the permeability measured at a tension of 150 pounds force per linear inch over that measured with no tension on the fabric.

The performance curves illustrated in FIGS. 5 and 6 for prior art fabrics are believed to be. fully consistent with the trends identified for such fabrics in U.S. Pat. No. 5,375,878 to Ellerbrok (incorporated by reference) wherein gas permeability is shown to be greatly increased when equal tensions are applied across the warp and the fill of prior fabric constructions. Specifically, FIGS. 1(a), 1(b) and 1(c) of the '878 patent show dramatic increases in permeability of at least 500 percent or more when traditional fabrics are subjected to equal tensions in the warp and the fill directions in the range of from zero up to about 150 pounds force per linear inch (26.25 KN/M).

While most standard air permeability tests are carried out at relatively low pressures in the range of 124 Pascals, it is understood that during a collision event, internal air bag pressures may be much higher. In FIGS. 7 and 8, the permeability characteristics of fabrics formed according to the weave pattern of FIG. 1 are illustrated at differential pressures of three pounds force per square inch. In FIG. 7, permeability measurements for fabric using 315 denier yarn according to the weave pattern of FIG. 1 and a plain weave fabric using 315 denier yarn according to the prior art at a nominal weave density of 60×60 threads per inch are illustrated across a range of tensions of equal magnitude in the warp and the fill directions. In FIG. 8, permeability measurements for fabric using 630 denier yarn according to the weave pattern of FIG. 1 and a plain weave fabric using 630 denier yarn according to the prior art at a nominal weave density of 41×41 threads per inch are illustrated across a range of tensions of equal magnitude in the warp and the fill directions.

As illustrated in FIGS. 7 and 8, the characteristic of fabrics of the present invention whereby there is not a substantial increase in permeability over a range of applied tensions is retained even when the fabric is exposed to a high differential pressure.

In FIG. 9, the permeability measurements for fabric formed according to the weave diagram of FIGS. 3 and 4, using a low denier construction of 70 denier yarn in the warp and 100 denier yarn in the weft is illustrated over a range of applied tensions in comparison to a plain weave fabric using the same yarns at a nominal weave density of 180×180 threads per inch. As illustrated, a dramatic reduction in permeability at increased tensions was obtained. The present invention is thus believed to be equally applicable to standard weight fabrics using yarns of between about 300 and about 840 denier as well as to lightweight fabrics using yarn of 300 denier or less.

In general it is believed that any increase in the permeability of the fabric of the present invention over a range of applied tensions of equal magnitude in the warp and the fill directions of between zero and about 150 pounds force per linear inch will be substantially less than that expected from prior art fabrics, and will preferably be in the range of about fifty percent or less. In more preferred embodiments, there will be substantially no increase in permeability with applied tensions and there may actually be a decrease in such permeability of twenty percent or more. In the most preferred embodiments, the fabric of the present invention will have the above-identified permeability retention characteristics and will also exhibit initial permeabilities at no tensional loading of not more than about five SCFM/FT$^2$ at about 124 Pascals across the fabric and may have initial permeabilities as low as about one SCFM/FT$^2$ or less.

The invention may be further understood and appreciated by reference to the following examples which are not to be construed as unduly limiting but are rather provided to facilitate understanding.

EXAMPLE 1

An air bag fabric was woven from 315 denier warp yarn and 315 denier filling yarn according to a weave pattern as illustrated and described with respect to FIGS. 1 and 2. The yarn utilized was single ply nonhollow nylon 6,6 available from AKZO N.V. The weaving was performed on a 210 centimeter Dornier weaving machine with a ¼ inch selvage and eight harnesses. The fabric was thereafter scoured and heatset in ordinary fashion yielding a product having physical properties as set forth in TABLE I.

TABLE 1

| 315 DENIER PRODUCT | |
|---|---|
| PROPERTY | VALUE |
| Weight | 5.85 oz./yd.$^2$ |
| End Count | 63 per inch |
| Pick Count | 65 per inch |
| Warp Tensile | 530 lbs./inch |
| Filling Tensile | 512 lbs./inch |
| Warp Elongation | 46 percent |
| Filling Elongation | 42 percent |
| Warp Tear | 92 pounds |
| Filling Tear | 79 pounds |
| Gauge | 0.12 inches |
| Warp Tongue | 35 pounds |
| Filling Tongue | 41 pounds |
| Warp Cant. | 281 KG/CM$^2$ |
| Filling Cant. | 318 KG/CM$^2$ |
| King Stiffness | 1.2 |
| Mullen Burst | 832 PSI |

Permeability was then measured with uniform tension applied around a fabric sample. The results are as illustrated in FIGS. 5 and 7.

EXAMPLE 2

An air bag fabric was woven from 630 denier warp yarn and 630 denier filling yarn according to a weave pattern as illustrated and described with respect to FIGS. 1 and 2. The yarn utilized was single ply nonhollow nylon 6,6 available from DuPont de Nemours. The weaving was performed on a 210 centimeter Dornier weaving machine with a ¼ inch selvage and eight harnesses. The greige fabric was thereafter scoured and heatset in ordinary fashion yielding a product having physical properties as set forth in TABLE 2.

TABLE 2

| 630 DENIER PRODUCT | |
|---|---|
| PROPERTY | VALUE |
| Weight | 8.38 oz./yd.$^2$ |
| End Count | 46 per inch |
| Pick Count | 48 per inch |
| Warp Tensile | 755 lbs./inch |
| Filling Tensile | 760 lbs./inch |
| Warp Elongation | 43 percent |
| Filling Elongation | 45 percent |
| Warp Tear | 179 pounds |
| Filling Tear | 200 pounds |
| Gauge | 0.17 inches |
| Warp Tongue | 61 pounds |
| Filling Tongue | 72 pounds |
| Warp Cant. | 140 KG/CM$^2$ |
| Filling Cant. | 148 KG/CM$^2$ |
| King Stiffness | 1.3 |
| Mullen Burst | 1,132 PSI |

Permeability was measured with uniform stress applied around a fabric sample. The results of the permeability measurement are as shown in FIGS. 6 and 8.

EXAMPLE 3

An air bag fabric was woven from a 420 denier warp yarn and a 420 denier filling yarn according to a weave pattern as illustrated and described with respect to FIGS. 1 and 2. The yarn utilized was single ply nonhollow nylon 6,6 available from AKZO N.V.. The weaving was performed on a 210 centimeter Dornier weaving machine with a ¼ inch selvage and eight harnesses. The fabric was thereafter scoured and heatset in ordinary fashion yielding a product having physical properties as set forth in TABLE 3.

TABLE 3

| 420 DENIER PRODUCT | |
|---|---|
| PROPERTY | VALUE |
| Weight | 6.93 oz./yd.$^2$ |
| End Count | 56 per inch |
| Pick Count | 57 per inch |
| Warp Tensile | 562 lbs./inch |
| Filling Tensile | 551 lbs./inch |
| Warp Elongation | 43 percent |
| Filling Elongation | 47 percent |
| Warp Tear | 135 pounds |
| Filling Tear | 114 pounds |
| Gauge | 0.14 inches |
| Warp Tongue | 51 pounds |
| Filling Tongue | 53 pounds |
| Warp Cant. | 187 KG/CM$^2$ |
| Filling Cant. | 164 KG/CM$^2$ |
| King Stiffness | 1 |
| Mullen Burst | 898 PSI |

EXAMPLE 4

A lightweight air bag fabric was woven from a 70 denier warp yarn and a 100 denier filling yarn according to a weave pattern as illustrated and described with respect to FIGS. 3 and 4. The yarn utilized was single ply nylon 6,6 available from Du Pont de Nemours. The weaving was performed on a 190 centimeter Nissan air-jet weaving machine with a ¼ inch selvage and six harnesses. The fabric was thereafter secured and heatset in ordinary fashion yielding a product having physical properties as set forth in TABLE 4.

TABLE 4

| FABRIC TEST RESULTS | |
|---|---|
| PROPERTY | VALUE |
| End Count | 197 per inch |
| Pick Count | 127 per inch |
| Weight | 3.73 oz./yd.$^2$ |
| Thickness | 8 mils |
| Warp Tensile | 305 lbs. force/inch |
| Filling Tensile | 360 lbs. force/inch |
| Warp Tear | 10.5 lbs. force |
| Filling Tear | 10.4 lbs. force |

Permeability was then measured with uniform stress applied around a fabric sample. The results of the permeability measurement are as shown in FIG. 9. Tests were terminated at about eighty pounds force due to the light nature of the fabric.

As can be seen, the present invention provides a fabric which has substantially improved retention of air permeability characteristics over that which is previously available in prior art fabrics. Such fabrics may be either of light weight or standard weight construction. While preferred embodiments of the invention have been illustrated and described, using specific terms, such description as been for illustrative purposes only, and it is to be understood that changes and variations may be made without departing from the spirit and scope of the invention which is defined and limited only by the appended claims and equivalents thereto.

What is claimed is:

1. An inflatable cushion for use in an occupant restraint system at least partially formed from uncoated woven textile fabric, wherein said textile fabric comprises a plurality of warp yarns disposed in a warp direction interwoven with a plurality of fill yarns disposed in a fill direction in a predetermined weave configuration such that the textile fabric has an air permeability which at no time increases by more than about fifty percent from that measured in a substantially untensioned state at a pressure drop of 124 Pascals (0.5 inches of water) across the fabric when the fabric is subjected to substantially equivalent tension forces in both the warp and the fill directions up to about 150 pounds force per linear inch.

2. The invention according to claim 1, wherein said textile fabric is woven according to a four pick repeat pattern.

3. The invention according to claim 2, wherein said textile fabric is formed from nylon warp yarns and nylon fill yarns.

4. The invention according to claim 2, wherein said warp yarns and said fill yarns each have a denier of between about 300 and about 840.

5. The invention according to claim 4, wherein said warp yarns are of substantially the same denier as said fill yarns.

6. The invention according to claim 1, wherein said textile fabric is woven according to a six pick repeat pattern.

7. The invention according to claim 6, wherein said textile fabric is formed from nylon warp yarns and nylon fill yarns.

8. The invention according to claim 6, wherein said warp yarns and said fill yarns each have a denier of between about 300 and about 840.

9. The invention according to claim 8, wherein said warp yarns are of substantially the same denier as said fill yarns.

10. An uncoated woven textile fabric for use in an inflatable cushion in an occupant restraint system, comprising: a plurality of warp yarns disposed in a warp direction interwoven with a plurality of fill yarns disposed in a fill direction in a predetermined weave configuration such that said textile fabric has an air permeability which at no time increases by more than about fifty percent from that measured in a substantially untensioned state at a pressure drop of 124 Pascals (0.5 inches of water) across the fabric when subjected to substantially equivalent tension forces in both the warp and the fill directions up to about 150 pounds force per liner inch.

11. The invention according to claim 10, wherein said textile fabric is woven according to a four pick repeat pattern.

12. The invention according to claim 11, wherein said textile fabric is formed from nylon warp yarns and nylon fill yarns.

13. The invention according to claim 11, wherein said warp yarns and said fill yarns each have a denier of between about 300 and about 840.

14. The invention according to claim 13 wherein said warp yarns are of substantially the same denier as said fill yarns.

15. The invention according to claim 10, wherein said textile fabric is woven according to a six pick repeat pattern.

16. The invention according to claim 15, wherein said textile fabric is formed from nylon warp yarns and nylon fill yarns.

17. The invention according to claim 15, wherein said warp yarns and said fill yarns each have a denier of between about 300 and about 840.

18. The invention according to claim 17, wherein said warp yarns are of substantially the same denier as said fill yarns.

19. The invention according to claim 10, wherein said fabric has an initial air permeability of not more than about five standard cubic feet of air per minute per square foot of fabric at a pressure drop of 124 Pascals (0.5 inches of water) across the fabric when the fabric is in a substantially untensioned state.

20. The invention as in claim 19, wherein said warp yarns and said fill yarns each have a denier of between about 300 and about 840.

21. The invention as in claim 20, wherein said warp yarns are of substantially the same denier as said fill yarns.

22. The invention as in claim 10, wherein said fabric has an air permeability which at no time increases by more than about twenty percent at a pressure drop of 124 Pascals (0.5 inches of water) when subjected to substantially equivalent tension forces in both the warp and the fill directions up to about 150 pounds force per linear inch.

23. The invention as in claim 22, wherein said warp yarns and said fill yarns each have a denier of between about 300 and about 840.

24. The invention as in claim 23, wherein said warp yarns are of substantially the same denier as said fill yarns.

25. The invention as in claim 22, wherein said fabric has an initial air permeability of not more than about three standard cubic feet of air per minute per square foot of fabric at a pressure drop of 124 Pascals (0.5 inches of water) across the fabric when the fabric is in a substantially untensioned state.

26. The invention as in claim 25, wherein said warp yarns and said fill yarns each have a denier of between about 300 and about 840.

27. The invention as in claim 26, wherein said warp yarns are of substantially the same denier as said fill yarns.

28. An uncoated woven textile fabric, comprising: a plurality of warp yarns disposed in a warp direction interwoven with a plurality of fill yarns disposed in a fill direction in a predetermined weave configuration such that said textile fabric has a measured air permeability which is not more than about three standard cubic feet of air per minute per square foot of fabric at a pressure drop of 124 Pascals (0.5 inches of water) across the fabric when the fabric is in a substantially untensioned state and said air permeability at no time increases by more than about fifty percent as measured at a pressure drop of 124 Pascals across the fabric when the fabric is subjected to substantially equivalent tension forces in both the warp and the fill directions up to about 150 pounds force per linear inch of fabric.

29. The invention according to claim 28, wherein said textile fabric is woven according to a four pick repeat pattern.

30. The invention according to claim 29, wherein said warp yarns and said fill yarns each have a denier of between about 300 and about 840.

31. An uncoated, woven textile fabric having a controlled air permeability, the fabric comprising: a plurality of warp yarns disposed in a warp direction interwoven with a plurality of fill yarns disposed in a fill direction in a predetermined weave configuration such that said fabric has an air permeability which decreases by about twenty percent or more from that measured in a substantially untensioned state at a pressure drop of three pounds force per square inch across said fabric when said fabric is subjected to substantially equivalent tension forces of about eighty pounds force per linear inch in both the warp and the fill directions.

32. The invention as in claim 31 wherein said warp yarns and said fill yarns each have a linear density of about 100 denier or less.

* * * * *